July 24, 1962 F. G. BUHRENDORF 3,045,884

TAPE DRIVE CONTROL SYSTEM

Filed June 4, 1959

INVENTOR
F. G. BUHRENDORF
BY Kenneth B. Hamlin
ATTORNEY

United States Patent Office 3,045,884

Patented July 24, 1962

3,045,884

TAPE DRIVE CONTROL SYSTEM

Frederick G. Buhrendorf, Westfield, N.J., assignor to Bell Telephone Laboratories, Incorporated, New York, N.Y., a corporation of New York Filed June 4, 1959, Ser. No. 818,033
5 Claims. (Cl. 226—50)

This invention relates to tape drive control systems and more particularly to such systems by which the longitudinal movement of a tape is controlled in discrete and finite steps.

Tape drive control systems are contemplated in this invention which convert digital signals into equivalent physical motion in the form of discrete increments of movement. Such a control system is particularly suited to applications in drive control circuits for moving information-bearing tapes and films in incremental steps. For example, it is often desired to move tapes and films in discrete steps, each step being equal to a word or particular quantity of information stored thereon, to check or recheck questionable information. Further, this invention may be employed advantageously to actuate many other types of automatic equipment in controlled finite steps.

Accordingly, it is an object of this invention to provide a tape drive control system for converting digital input signals into predetermined translational movement of a tape.

Another object of the invention is to provide a tape drive control system whereby the longitudinal movement of a tape can be controlled in discrete and finite steps in either direction.

A further object of the invention is to provide a tape drive control system wherein a locking action can be established electrically between the stator and the rotor of the drive motor thereof to define accurately the cessation of each step.

An additional object of this invention is to provide means for moving an information-bearing tape or film in discrete steps, each step being equal to a specific quantity of information stored thereon.

It is also an object of the present invention to provide a tape drive control system whereby a tape being driven at a high velocity in a longitudinal direction may be rapidly stopped and selectively backspaced a predetermined distance.

These and other objects are attained in ilustrative embodiments of the present invention, a first embodiment of which includes a synchronous drive motor, having a rotor and at least two stator windings, coupled through an output shaft to a tape-driving capstan. A function generator, or waveforming circuit, controlled by control circuitry selectively applies particular waveforms to the stator windings of the motor to effect predetermined rotation of the rotor thereof, which imparts step-by-step movement to a tape clamped to the capstan.

In a second embodiment of the invention, a pair of such motors are utilized selectively to drive associated tape-driving capstans in opposite directions. Switching circuitry applies alternating current to the windings of one motor and direct current to one winding of the other motor, and the tape is selectively clamped to the capstan associated with the one or the other motor to drive or to stop the tape, respectively. When the tape is stopped, a function generator or waveforming circuit, controlled by control circuitry, applies particular waveforms to the stator windings of the motor coupled to the capstan to which the tape is clamped to backspace the tape a predetermined distance.

In accordance with one aspect of the present invention, direct current is applied to at least one winding of the motor causing the rotor to resist motion in either direction. Thus, a tape clamped to a capstan coupled to the rotor resists movement in either direction. The direct current in the one winding is caused to decline to zero and, concurrently, direct current in another winding is caused to increase from zero. A magnetic field is thereby produced which rotates through ninety electrical degrees each time the direct current in the one winding declines from a peak magnitude to zero and, simultaneously, the direct current in another winding increases from zero to a peak magnitude. The rotor follows the magnetic field and rotates through on angle equal to one-half pole spacing. The process of increasing and decreasing the currents in the respective windings may be thus continued, controlling the rotation of the rotor, and hence the movement of the tape, in finite steps.

Another aspect of the present invention is directed toward its advantageous application for braking and backspacing in an information-bearing tape drive control system. A capstan driving the tape is coupled to a motor, and the tape is clamped to the capstan. One winding of the motor is selectively connected to a source of direct current to effect braking control of the driving capstan. Stepping of the tape is thereafter effected by varying the direct current in the one winding, preferably as a cosine function, through one cycle, and concurrently applying direct current to another winding, preferably varying as a sine function through one cycle. The magnetic field produced will rotate through one electrical revolution; and thus, the rotor will follow the magnetic field and rotate through an angle equal to two pole spacings. This rotation is coupled to the capstan to produce longitudinal movement of the tape clamped thereto. The longitudinal movement of the tape is thus controlled in discrete steps in accordance with the number of cycles of varying direct current applied to the respective windings of the motor.

Accordingly, it is a feature of my invention that a taped drive control system include an electric motor having at least two windings and an output shaft, a source of direct current, circuitry for varying the direct current from zero to a peak magnitude and applying it to one winding of the motor, and circuitry for varying the direct current from a peak magnitude to zero and applying it to another winding of the motor.

It is a further feature of my invention that the source of direct current be varied as a sine function through one cycle and applied to one winding of the motor and, concurrently, as a cosine function through one cycle and applied to another winding of the motor whereby the output shaft of the motor is caused to rotate through a discrete and finite angle.

It is an additional feature of my invention that a tape drive control system include circuitry for applying direct current to at least one winding of the motor causing the output shaft to resist motion in either direction when the varying currents are removed from the windings of the motor.

It is another feature of my invention that a tape drive control system include a pair of motors each having a rotor and two field windings, switching circuitry for selectively applying alternating current to the field windings of one of the motors and direct current to one of the field windings of the other motor, means for selectively coupling the rotor of one of the motors to an information-bearing tape, and waveforming circuitry for selectively applying an integral number of cycles of current varying as a sine function to one winding and an integral number of cycles of current varying as a cosine function to the other winding of one of the motors.

These and other objects and features of this invention will be better understood upon consideration of the following detailed description and the accompanying drawings, in which.

Figure 1:
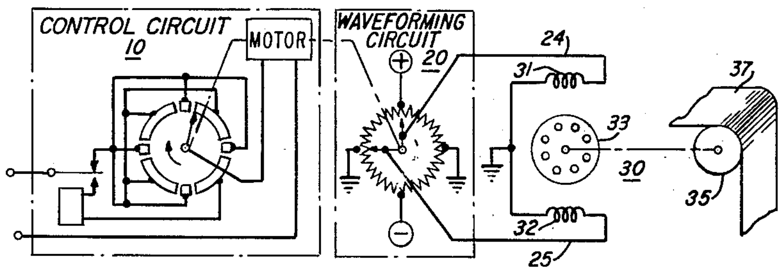
FIG. 1 is a block diagram of an illustrative embodiment in accordance with the principles of my invention.

Referring more particularly to the drawings, FIG. 1 shows an illustrative embodiment of a tape drive control system in accordance with the principles of my invention comprising control circuit 10, waveforming circuit 20 and motor 30. Advantageously, motor 30 is a substantially conventional hysteresis synchronous motor having rotor 33 and stator windings 31 and 32. Rotor 33 is coupled through an output shaft, or similar arrangement, to capstan 35. Tape 37 may be operatively clamped to capstan 35 by frictional, electrostatic or pneumatic means known in the art to impart translational movement to tape 37 in response to the rotation of capstan 35.

When the circuit of FIG. 1 is in the "off" condition, waveforming circuit 20 applies direct current to one of the stator windings 31 or 32. Consider, for purposes of illustration, that positive-going direct current is being applied to winding 31 and that winding 32 is connected to ground. The direct current passing through winding 31 causes a torque to be produced which resists motion of rotor 33 in either direction. This can be considered the initial rest position of rotor 33. This condition is represented in FIG. 2 of the drawing by period of time 43, where input waveform 41 is being applied to winding 31 and input waveform 42 is being applied to winding 32.

Under control of circuit 10, waveforming circuit 20 is actuated for a predetermined period of time to effect rotational movement of rotor 33 through a discrete angle or step. This is accomplished by waveforming circuit 20 varying the direct current applied through lead 24 to winding 31 from the initial peak positive magnitude to zero. Concurrently, the direct current applied to winding 32 through lead 25 increases from zero to a positive peak magnitude. At this point, direct current is applied to winding 32, and winding 31 is connected to ground. This variation in the input waveforms to windings 31 and 32 is illustrated graphically during period of time 44 in FIG. 2.

Figure 2:
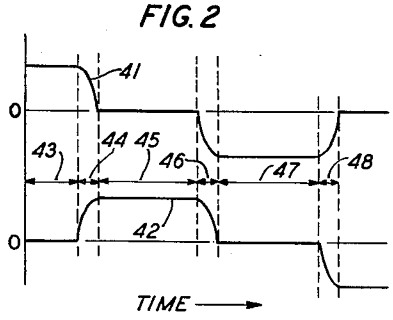
FIG. 2 is a graphical representation of illustrative input waveforms utilized in a particular embodiment.

The input waveforms applied to windings 31 and 32 during period of time 44 in FIG. 2 produce a magnetic field which rotates through an angle of ninety electrical degrees. Rotor 33 follows the field produced and moves through an angle equal to one-half pole spacing. At this point, the direct current in winding 32 will cause a torque to be produced which resists motion of rotor 33 in either direction from its new rest position. The new rest position is, of course, one-half pole spacing from the initial rest position.

When it is desired to advance rotor 33 through another step or angle, control circuit 10 is again operated to actuate waveforming circuit 20 to vary the currents applied to windings 31 and 32. Thus, as is shown during period of time 46 in FIG. 2, the current in winding 32 decreases to zero and the current in winding 31 increases to a peak negative magnitude. Rotor 33 follows the resultant field produced and rotates through an angle equal to one-half pole spacing. Period of time 48 in FIG. 2 illustrates the variation in the input waveforms to windings 31 and 32 when waveforming circuit 20 is again actuated by control circuit 10, causing rotor 33 to rotate through another step.

As mentioned above, the physical motion of rotor 33 is transferred to capstan 35 by suitable output shaft coupling. Rotational movement of capstan 35 imparts translation motion to tape 37, which is coupled to capstan 35 by any one of the known methods. Thus, rotation of capstan 35 through a particular angle moves tape 37 through a predetermined distance, which may be advantageously the space wherein a specific quantity of information is stored.

Waveforming circuit 20 is considered in FIG. 1 in terms of the output waveforms produced thereby on leads 24 and 25 for purposes of describing the invention. Any of the known circuitry for the generation of the desired waveforms could, of course, be used in waveforming circuit 20. For example, such a waveforming circuit may advantantageously include resistive networks containing biased diode switches, or it may include a driven potentiometer circuit. Reference is made to pages 290 through 344 of the book Electronic Analog Computers, by G. A. Korn and T. M. Korn, published by McGraw-Hill Book Company, 1956, wherein are shown suitable waveforming and function generation circuits which may be included in waveforming circuit 20. By way of illustration, waveforming circuit 20 in FIG. 1 includes a driven potentiometer arrangement having two wipers, disposed ninety degrees apart, connected to windings 31 and 32, respectively. The wipers are driven in the direction indicated by the arrow, under the control of control circuit 10, and the direct current applied to windings 31 and 32 is varied thereby in the manner described hereinbefore.

Control circuit 10 may include any source of input information to which the particular circuitry in waveforming circuit 20 will respond. The Design of Switching Circuits, by Keister, Ritchie and Washburn, published by D. Van Nostrand Company, 1951, teaches suitable circuitry for use in control circuit 10, such as the rotary selector switching circuits described on pages 179 through 199. For example, as illustrated in FIG. 1, control circuit 10 may advantageously include a pushbutton which is operated to cause a rotary switch to "run" through one-fourth revolution, in a manner known in the art and described in the above-mentioned text. Each successive operation of the pushbutton causes the rotary switch to advance through one-fourth revolution. The rotary switch drives the potentiometer circuit in waveforming circuit 20 through one-fourth revolution, via common shaft coupling, to produce the desired waveforms.

Moreover, an electronic readout device or suitable digital circuitry can be included in control circuit 10 which may be programmed to actuate waveforming circuit 20 automatically in a predetermined manner; or, waveforming circuit 20 may be actuated in accordance with variations in the information stored on tape 37. Clearly, there are many devices which may be used advantageously in control circuit 10 and waveforming circuit 20.

Therefore, as described hereinabove, the motion of rotor 33 is controlled in discrete and finite steps, each step being an angle of rotation equal to one-half pole spacing in the illustrative example above. Of course, any integral multiple of an angle of rotation equal to one-half pole spacing can be defined as an increment or step, and the movement of the rotor through the so-defined step is effected by the application of the appropriate number of cycles of increasing and decreasing currents to the field windings. For example, an angle of rotation of two pole spacings may be defined advantageously as one step, necessitating the application of one complete cycle of increasing and decreasing currents to the windings. This may be effected in the illustrative circuit of FIG. 1 by providing suitable coupling between waveforming circuit 20 and control circuit 10, such that one-fourth revolution of the rotary switch of circuit 10 drives the potentiometer wipers of circuit 20 through one complete revolution. Further, the currents applied to the field windings may be varied advantageously as sine and cosine functions. Illustrative input waveforms for a motor control system with the steps so defined and so varied are graphically represented in FIG. 3 of the drawing.

Figure 3:
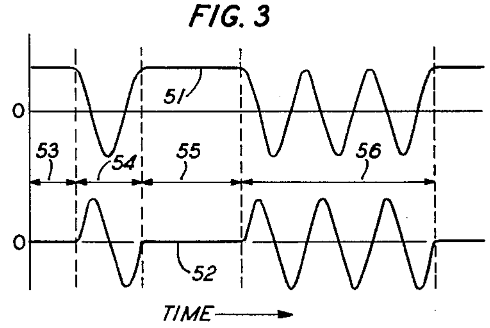
FIG. 3 is a graphical representation of illustrative input waveforms utilized in another particular embodiment.

In FIG. 3, current waveform 51 is applied to one of the field windings, and current waveform 52 is applied to the other winding. During periods of time 53 and 55, the system is in the "off" condition and the rotor resists motion in either direction. During period of time 54, a waveforming circuit applies one cycle of current varying as a cosine function to one of the windings and applies one cycle of current varying as a sine function to the other winding. The field produced thereby moves through one electrical revolution, and the rotor follows it, moving through an angle equal to two pole spacings. In a four-pole per winding motor, for example, this would be an angle of one hundred and eighty mechanical degrees, or one-half revolution of the rotor. During period of time 56 in FIG. 3, the rotor is caused to move through three steps, or one and one-half revolutions for a four-pole per winding motor, by applying three cycles of current to the field windings.

A second embodiment of my invention in accordance with the principles described above is shown in FIG. 4 of the drawing. The particular application shown is in connection with braking and backspacing control circuitry in an information-bearing tape drive system. In the right-hand portion of FIG. 4, part of such a tape drive system is shown. The storage reel 97 and a second storage reel not shown are used to store tape 95, and they are driven by separate motors not shown. Both of the reels rotate in either direction to take up tape 95 or to let it out. Similarly, capstans 93 and 94 are driven by motors 91 and 92, respectively, except that capstans 93 and 94 drive only in the directions indicated by the arrows, the one capstan for driving tape 95 in the forward direction and the other for driving it in the reverse direction. The sensing element 100 issued for reading in and reading out of information to and from tape 95.

Figure 4:
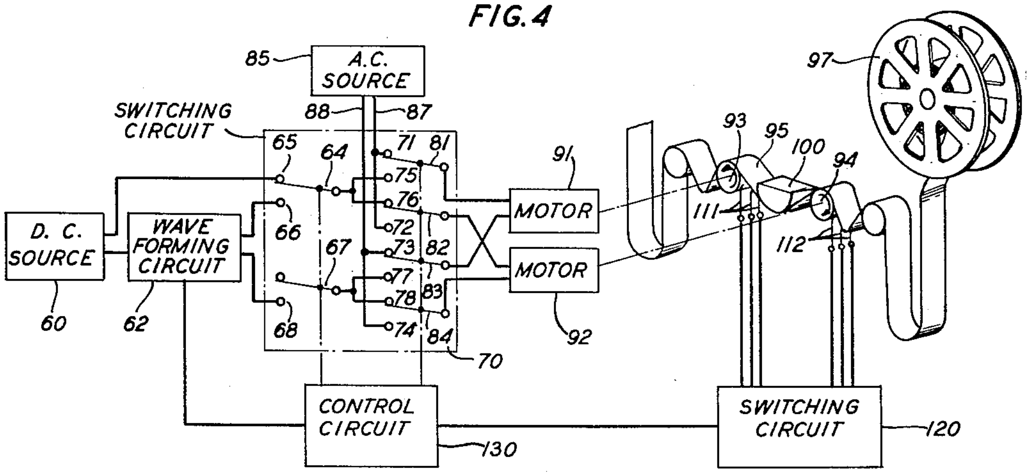
FIG. 4 is a block diagram of an additional illustrative embodiment of my invention.

The particular tape drive system shown in FIG. 4 of the drawing contemplates the use of electrostatic clutches for coupling tape 95 to the driving or braking capstan. Of course, any known arrangement for coupling tape to a capstan may be employed in this tape drive control circuit. An electrostatic clutch in such a system comprises a capstan and the information-bearing tape, each responsive to electrostatic forces. The electrostatic clutch operates on the principle of the attraction of two plates of an electrically charged condenser. The capstan consists of a conductive member and acts as one of the plates, and a conductive member in the tape acts as the other plate. The two plates are separated by a dielectric bonded either to the surface of the capstan or to the surface of the tape facing the capstan, or to both. The electrostatic forces are generated upon application of alternating voltage to the conductive member or members in the capstan, thereby attracting the tape to the capstan.

The capstans 93 and 94 include three insulated conductive segments. The three segments of capstan 93 are connected through individual brushes 111, or some similar known arrangement, to switching circuit 120. In a like manner, the three segments of capstan 94 are connected through brushes 112 to switching circuit 120. Under control of control circuit 130, switching circuit 120 applies three-phase, alternating-current power to capstan 93 or 94 through brushes 111 or 112. When voltage is applied to one of the capstans 93 or 94, electrostatic force generates a radial pressure on tape 95, drawing it toward the particular capstan. Such a circuit for switching high voltage, alternating-current power to electrostatic clutches in a tape drive system is disclosed in detail in a copending application of R. P. Miller, Serial No. 781,077, filed December 17, 1958, now Patent 3,030,524 issued April 17, 1962.

In normal operation of such a tape drive system, it is contemplated that while one capstan is rotating, driving the tape in a particular direction, the other capstan remains stationary. Thus, braking of tape 95 may be advantageously effected by removing the clutching power from the driving capstan and applying it to the stationary capstan. The electrostatic force generated at the stationary capstan, therefore, stops the moving tape very rapidly. Thereafter as will be explained hereinbelow, tape 95 can be backspaced, or moved backwards in discrete steps, by applying appropriately varying direct currents to the windings of the motor coupled to the stationary capstan.

The tape drive control circuitry shown in FIG. 4 includes direct-current source 60, waveforming circuit 62, switching circuit 70, alternating-current source 85, control circuit 130 and motors 91 and 92. Motors 91 and 92 are advantageously of a type similar to motor 30 in FIG. 1, each having a rotor and at least two stator windings. The rotors of motors 91 and 92 are coupled to capstans 93 and 94, respectively, through suitable output shaft coupling. The two windings of motor 91 are connected respectively to switches 81 and 83, and the windings of motor 92 are connected to switches 82 and 84. Switches 81 through 84 are interlocked and operate under control of control circuit 130.

Direct current is supplied by direct-current source 60 to contact 65 and to waveforming circuit 62. Two distinct outputs from waveforming circuit 62 are connected respectively to contacts 66 and 68. Contact 66, as well as contact 65, is associated with switch 64, and contact 68 is associated with switch 67. Switches 64 and 67 are interlocked for substantially simultaneous operation and operate under control of control circuit 130. Further, switch 64 is connected in common to contacts 75 and 76, and switch 67 is connected to contacts 77 and 78. In addition, switching circuit 70 includes contacts 71 and 72 connected to alternating-current source 85 through conductor 87 and contacts 73 and 74 connected to source 85 through conductor 88. The function of switching circuit 70 is to select the motor and associated capstan to which alternating-current driving power is applied, and to which braking and back-spacing energy is applied.

The function of waveforming circuit 62 is substantially similar to that of waveforming circuit 20 in FIG. 1. Waveforming circuit 62 is energized under the control of control circuit 130, and current varying in the manner described above and as illustrated in FIGS. 2 and 3 becomes available at contacts 66 and 68. The current at contact 66 is increasing when the current at contact 68 is decreasing, and vice versa. Further, when the current at one contact is at a peak magnitude, positive or negative, the current available at the other contact is zero. For purposes of describing the invention, it is assumed that the current available at contact 66 varies as a cosine function and the current available at contact 68 varies as a sine function. When waveforming circuit 62 is energized, the current at contact 66 will be initially at a peak magnitude approximately equal to the magnitude and of the same polarity as the direct current available at contact 65. Therefore, as discussed in FIG. 3, each cycle of sine and cosine currents applied to the windings of one of the motors through switching circuit 70 will cause the rotor thereof to rotate through an angle equal to two pole spacings.

Considering the operation of the circuit of FIG. 4 with switches 64, 67 and 81 through 84 in the positions shown, alternating current is applied through conductor 87, contact 71 and switch 81 to one winding of motor 91 and through conductor 88, contact 73 and switch 83 to the other winding of motor 91. This energizes motor 91 to drive capstan 93 in the direction indicated by the arrow shown thereon. Switching circuit 120 causes high voltage, alternating-current power to be applied through brushes 111 to capstan 93. Electrostatic forces generated thereby clutch tape 95 to rotating capstan 93, imparting translational motion thereto. At the same time, direct current is applied through contact 65, switch 64, contact 76 and switch 82 to one winding of motor 92. Torque is developed thereby which resists motion of capstan 94 in either direction.

When it is desired to stop the movement of tape 95, switching circuit 120 is operated under the control of control circuit 130 to cause the power to be removed from capstan 93 and to be applied through brushes 112 to stationary capstan 94. Tape 95 is electrostatically clutched to capstan 94, bringing it to a stop very rapidly. Thereafter, tape 95 is backspaced incrementally under control of control circuit 130 which operates switches 64 and 67 to contacts 66 and 68. Waveforming circuit 62 is energized by control circuit 130 to apply current varying as a cosine function through switches 64 and 82 to one winding of motor 92 and to apply current varying as a sine function through switches 67 and 84 to the other winding of motor 92. Waveforming circuit 62 is energized by control circuit 130 for a period of time such that an integral number of cycles of currents are applied to the windings of motor 92, causing the rotor thereof to rotate through an angle equal to twice the integral number of pole spacings. Capstan 94, coupled thereto, rotates through a corresponding angle, imparting a corresponding longitudinal movement of tape 95 beneath sensing element 100. The period of time that waveforming circuit 62 is energized thus determines the distance through which tape 95 is backspaced.

Release of switches 64 and 67 reapplies direct current through contact 65 and switch 64 to one winding of motor 92, stopping tape 95. Direction of tape drive is thereafter controlled by operating switches 81 through 84 to apply alternating current to the appropriate one of motors 91 or 92, and by applying alternating-current power to the capstan coupled to the above motor for clutching tape 95 thereto. At the same time, switch 81 or 82 applies direct current from source 60 to one winding of the other motor to hold its associated capstan stationary.

The operation of waveforming circuit 62 and of switching circuits 70 and 120 is controlled in the embodiment shown in FIG. 4 by control circuit 130. To effect this control, control circuit 130 may include any source of input information such as pushbuttons, electronic readout devices or suitable digital circuitry. Advantageously, control circuit 130 is programmed to stop tape 95 upon receipt of a signal indicating a bit of doubtful information stored on the tape, and to then backspace tape 95 the desired distance to recheck the doubtful information. Then control circuit 130 reenergizes the tape drive in the original direction or energizes it in the reverse direction.

It is to be understood that the above-described arrangements are illustrative of the application of the principles of the invention. Numerous other arrangements may be devised by those skilled in the art without departing from the spirit and scope of this invention.

What is claimed is:

1. In a tape drive control system adapted to drive a tape incrementally, a source of direct current, a motor having two field windings and a rotor, means coupling said rotor to said tape, alternating current means normally connected to said field windings to drive said rotor at a constant velocity, waveforming means having two outputs, one providing current varying as a cosine function and the other providing current varying as a sine function, first switching means operative to connect said one of said outputs to one of said field windings, second switching means operative to connect said other of said outputs to the other of said field windings, control means for disconnecting said alternating current means from said field windings and for operating said first and second switching means for a time duration substantially equal to the time duration of an integral number of cycles of said sine and cosine currents, and means controlled by said control means for applying direct current from said source to said one of said field windings when said first and second switching means are not operated and when said alternating current means is not connected to said field windings.

2. In a tape drive control system for driving a tape, a source of direct current, a source of alternating current, a first motor having two field windings, a second motor having two field windings, waveforming means for generating current varying as a sine function at one output and current varying as a cosine function at another output, control means, first switching means controlled by said control means for selectively connecting said source of alternating current to said field windings of one of said first and second motors, second switching means controlled by said control means for selectively connecting said source of direct current to one of said field windings of the other of said first and second motors, means controlled by said control means for selectively coupling one of said first and second motors to said tape, and means controlled by said control means for connecting said outputs of said waveforming means to said field windings of said other motor when said other motor is coupled to said tape, said last named means operative for a time duration substantially equal to the time duration of an integral number of cycles of said currents from said waveforming means.

3. In a tape drive control system, a tape, a source of direct current, a source of alternating current, a first motor having first and second field windings, a second motor having first and second field windings, means connecting said source of alternating current to said field windings of said first motor, means connecting said source of direct current to said first field winding of said second motor, switching means connected to said first and second field windings of said second motor, means controlled by said switching means for applying a predetermined integral number of cycles of current varying as a cosine function to said first winding of said second motor and for concurrently applying a predetermined integral number of cycles of current varying as a sine function to said second winding of said second motor, means for selectively coupling one of said first and second motors to said tape, and control means for disconnecting said source of direct current from said first field winding of said second motor and substantially simultaneously operating said switching means when said tape is coupled to said second motor.

4. In a tape drive control system, an electric motor having a rotor and at least two stator windings, control means for electrically positioning said rotor with respect to said stator windings, waveforming means for generating current as a sine function at a first output and as a cosine function at a second output, means actuated by said control means for controlling said waveforming means to simultaneously apply a predetermined number of cycles of current from said first output to one of said windings and from said second output to another of said windings, and means for applying alternating current to said windings when said currents from said first and second outputs of said waveforming means are not applied to said windings.

5. In a tape drive control system for incrementally driving a tape in response to input signals, the combination comprising an electric motor having a rotor and two field windings, drive energization means for normally applying alternating current to said field windings to drive said rotor at a constant velocity, control means responsive to said input signals for removing said alternating current from said field windings and for electrically positioning said rotor with respect to said field windings, waveforming means simultaneously providing current varying as a sine function at a first output terminal and current varying as a cosine function at a second output terminal, first switching means for connecting said first output terminal to one of said field windings, second switching means for connecting said second output terminal to the other of said field windings, and means responsive to said control means for operating said first and second switching means simultaneously for a time duration substantially equal to the time duration of an integral number of quarter cycles of said current from said waveforming means.

References Cited in the file of this patent

UNITED STATES PATENTS

| | | |
|---|---|---|
| 2,706,270 | Steele | Apr. 12, 1955 |
| 2,774,026 | Towner | Dec. 11, 1956 |
| 2,809,335 | Welch | Oct. 8, 1957 |
| 2,831,678 | MacNeill | Apr. 22, 1958 |
| 2,863,108 | Raffensperger | Dec. 2, 1958 |

FOREIGN PATENTS

| | | |
|---|---|---|
| 685,032 | Great Britain | Dec. 31, 1952 |